United States Patent
Baghdady et al.

(10) Patent No.: US 10,545,651 B2
(45) Date of Patent: Jan. 28, 2020

(54) PROVIDING BITMAP IMAGE FORMAT FILES FROM MEDIA

(71) Applicant: Fox Broadcasting Company, Los Angeles, CA (US)

(72) Inventors: Hend Baghdady, Beverly Hills, CA (US); Benjamin Q. Jones, Los Angeles, CA (US); Michael J. Schmelling, Los Angeles, CA (US); Nicholas Weidenfeld, Los Angeles, CA (US); Nicole L. Wilke, Los Angeles, CA (US)

(73) Assignee: FOX BROADCASTING COMPANY, LLC, Los Angeles, CA (US)

( * ) Notice: Subject to any disclaimer, the term of this patent is extended or adjusted under 35 U.S.C. 154(b) by 1020 days.

(21) Appl. No.: 14/905,761

(22) PCT Filed: Jul. 15, 2014

(86) PCT No.: PCT/US2014/046740
§ 371 (c)(1),
(2) Date: Jan. 15, 2016

(87) PCT Pub. No.: WO2015/009750
PCT Pub. Date: Jan. 22, 2015

(65) Prior Publication Data
US 2016/0179356 A1    Jun. 23, 2016

Related U.S. Application Data

(60) Provisional application No. 61/846,564, filed on Jul. 15, 2013.

(51) Int. Cl.
*G06F 3/0484*    (2013.01)
*G06F 3/0482*    (2013.01)
(Continued)

(52) U.S. Cl.
CPC ........ *G06F 3/04847* (2013.01); *G06F 3/0482* (2013.01); *G06F 3/04842* (2013.01); *G06F 16/44* (2019.01); *G06T 13/80* (2013.01); *G11B 27/031* (2013.01); *G11B 27/30* (2013.01); *H04N 21/47205* (2013.01); *H04N 21/8455* (2013.01); *H04N 21/8456* (2013.01); *H04N 21/8549* (2013.01)

(58) Field of Classification Search
CPC . G06F 3/04842; G06F 3/04847; G06T 13/80; G11B 24/031; G11B 24/30; H04N 21/8456; H04N 21/47205
See application file for complete search history.

(56) References Cited

U.S. PATENT DOCUMENTS 8,341,662 B1    12/2012  Bassett et al.
9,826,286 B2 *  11/2017  Tang ................. H04N 21/8586
(Continued)

OTHER PUBLICATIONS

International Search Report and Written Opinion dated Oct. 27, 2014 for PCT App. No. PCT/US2014/046740.
(Continued)

*Primary Examiner* — Eric J. Bycer
(74) *Attorney, Agent, or Firm* — Gates & Cooper LLP

(57) ABSTRACT

A method, apparatus, article of manufacture, and a memory structure for conveniently providing animated bitmap image files from media is described. The method uses a technique in which a plurality of PNG files are generated and transmitted to be presented to the user via an overlay to a media program player.

29 Claims, 10 Drawing Sheets

(51) Int. Cl.
    *G06T 13/80*     (2011.01)
    *G11B 27/031*     (2006.01)
    *G11B 27/30*     (2006.01)
    *H04N 21/472*     (2011.01)
    *H04N 21/845*     (2011.01)
    *H04N 21/8549*     (2011.01)
    *G06F 16/44*     (2019.01)

(56) References Cited

U.S. PATENT DOCUMENTS

| | | |
|---|---|---|
| 2002/0116716 A1 | 8/2002 | Sideman |
| 2005/0076363 A1 | 4/2005 | Dukes et al. |
| 2008/0263616 A1 | 10/2008 | Sallinen et al. |
| 2008/0307307 A1* | 12/2008 | Ciudad .................. G06T 13/80 715/719 |
| 2010/0114857 A1 | 5/2010 | Edwards et al. |
| 2012/0137223 A1 | 5/2012 | Nicol et al. |
| 2013/0129317 A1* | 5/2013 | Moorer ............ H04N 21/23424 386/241 |
| 2013/0300750 A1* | 11/2013 | Mishra ................... G06T 13/00 345/474 |
| 2014/0218370 A1* | 8/2014 | Mishra ................... G06T 13/00 345/473 |

OTHER PUBLICATIONS

International Preliminary Report on Patentability dated Jun. 8, 2015 for PCT App. No. PCT/US2014/046740.

* cited by examiner

PROVIDING BITMAP IMAGE FORMAT FILES FROM MEDIA

CROSS REFERENCE TO RELATED APPLICATIONS

This application is a National Stage Application of and claims benefit under 35 U.S.C. § 365 to PCT Patent Application No. PCT/US2014/046740, entitled "PROVIDING BITMAP IMAGE FORMAT FILES FROM MEDIA," by Hend Baghdady, et al., filed Jul. 15, 2014, which claims benefit of U.S. Provisional Patent Application Ser. No. 61/846,564, entitled "METHOD AND APPARATUS FOR CONVENIENTLY PROVIDING BITMAP IMAGE FORMAT FILES FROM MEDIA," by Hend Baghdady, Benjamin Q. Jones, Michael J. Schmelling, Nicholas Weidenfeld, and Nicole L. Wilke, filed Jul. 15, 2013, both of which applications are hereby incorporated by reference herein.

BACKGROUND OF THE INVENTION

1. Field of the Invention

The present invention relates to systems and methods for presenting media programs, and in particular to a system and method and apparatus for conveniently creating sharable files from portions of those media programs.

2. Description of the Related Art

The dissemination and playback of media programs has undergone substantial changes in the past decade. Previously, media programs (which may include audio, video, or both) were disseminated either by analog broadcast (conventional, satellite, or cable) or by physical dissemination of films to movie theaters. These traditional dissemination and playback means remain in use after the advent of digital technology. However, digital technologies have had a profound effect on the dissemination and playback of media programs.

Largely due to improved signal processing and more and widespread high-speed Internet access availability (e.g. digital subscriber line or DSL, fiber, and/or satellite), digital technology permits the dissemination and playback of media programs via the Internet via the use of content delivery networks having web servers and streaming media servers.

Web servers typically use HTTP (hypertext transport protocol) on top of TCP (transfer control protocol) to transfer files over the network. Streaming media servers deliver media content continuously to a media player and media playback occurs while further portions of the media program are received. The end-user is capable of playing the media immediately upon delivery by the content provider.

Traditional streaming techniques originate from a single provider delivering a stream of data to a set of end-users. High bandwidths and central processing unit (CPU) throughput are required to deliver a single stream to a large audience, and the required bandwidth of the provider increases as the number of end-users increases. Typically, streamed media is delivered via a content delivery network (CDN) having a plurality of dedicated streaming media servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player.

Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Streaming media players provide random access to any point in the media program through the use of control messages transmitted from the media player to the streaming media server. Streaming media servers allow the media to be played back via media players that can be embedded in webpages. This is usually accomplished by embedding code provided in the source of the webpage. For example, if the webpage host wishes to embed a particular media program in a webpage, the host's webmaster copies the code including a link to media program player instructions as well as a link to the media program itself into the source of the webpage. Embedding may also be used to present a media program in a social forum or other media. When the embedded media program player code instructions are executed, the user's browser presents a rendering of the media program player with the playback area.

One of the problems with the presentation of media programs in digital form is protection of the copyrights to the media program. Streaming media servers help solve this problem as the media program itself is not downloaded to the user-computer in such a way that it can easily be copied or assembled into a media program file. Instead, the media program data is buffered by the media program player, played back when appropriate, and discarded in favor of other portions of the media program. While there are software programs that can be used to digitally extract (or rip) media programs from the media program player, many media program players and CDNs are designed to make such ripping difficult or impossible.

At the same time, it is sometimes beneficial to allow users to create lightweight (e.g. small) copies of portions of media programs and disseminate or share such copies with friends. The dissemination of such copies can promote the media program and entice others to view it, without encouraging them to obtain the full media program from unauthorized sources. Such copying may be even more attractive to the owner of the media program if it can be monitored and controlled.

What is needed is a method and apparatus for allowing users to create easily shareable copies of media programs while permitting the monitoring and control of such copies. The present invention satisfies that need.

SUMMARY OF THE INVENTION

To address the requirements described above, the present invention discloses a method and apparatus for generating an animated bitmap image file from a video media program file depicting a media program, the media program file comprising a sequence of images. In one embodiment, the method comprises accepting a request to generate the animated image file from a control presented in a media player presented by a remote processing device, the media player for playing the media program using the remote processing device in a media program presentation area; retrieving at least a subset of a stored plurality of image files of the media program, each of the stored plurality of images files having only one static image and created from at least one image of the sequence of images and associated with a unique time index; transmitting an overlay for presentation by the browser over the media player; accepting a command entered via the overlay to create the animated image file; and generating the animated image file based upon selected one or more of the retrieved subset of image files. The overlay may comprise an image window for presenting at least one of the retrieved subset of the plurality of image files, the image window substantially spatially co-extensive with a viewing area of the media player; a first image navigation control, for graphically indicating a temporal location of a temporal center of the retrieved subset of image files; and a second image navigation control, for selecting the presented image file for presentation in the image window from among the retrieved subset of image files, for graphically indicating the temporal location of the presented image file relative to the retrieved subset of image files, for selecting one or more of the retrieved subset of image files for the generating of the animated image file;

Another embodiment is described by an apparatus for generating an animated bitmap image file from a video media program file depicting a media program, the media program file comprising a sequence of image. The apparatus comprises a server, for accepting a request to generate the animated bitmap file from a control presented in a media player presented executed by a remote processing device, the media player for playing the media program using the remote processing device in a media program presentation area and a queuing system, communicatively coupled to the first server, for retrieving at least a subset of a stored plurality of image files of the media program, each of the stored plurality of images files having only one static image and created from at least one image of the sequence of images and associated with a unique time index; wherein the server further accepts a command entered via the overlay to create the animated image bitmap file and the apparatus further comprises an image generation processor, communicatively coupled to the queuing system, for generating the animated image bitmap file from the selected one or more of the presented subset of the plurality of image files.

This describes a method and apparatus whereby an animated bitmap image file (ABIF) is generated from a plurality of image files that may be generated from video files in response to a user request, or generated before the user request and retrieved in response to the user request. Those image files are modified as necessary, optionally compressed to a file size and image resolution sufficient for the user to view and select images for use in generating the ABIF, and transmitted to the client processing device and presented in an interface that mimics elements of a video player that the interface is overlaid upon. Using the interface, the user can specify which images are to be used in generating the ABIF, may be permitted to modify those images (e.g. cropping images and adding text) to obtain an ABIF meeting their needs. This solution (transmitting images, rather than video to the client computing device) and using an overlay over a standard video player that mimics the video player offers particular advantages over other possible solutions, namely:

(1) In many cases, the client computing device is a smartphone or similar device has limited storage and limited communication bandwidth. The transmission, processing, and/or buffering of video files in such devices can be difficult implement. In contrast, the transmission of lightweight image files (compressed so as to permit viewing for editing purposes) can be accomplished using much less bandwidth, and image files can be selected and manipulated using lightweight applications on the computing device itself.

(2) Static image files (single images that do not depict motion) can be more easily and efficiently modified and can be modified in more ways than can video image files. The result is that the use of image files permits the user to select precisely the frames they would like to use in generating the ABIF without needing video editing software or a high bandwidth link to the content provider, and the resulting ABIF can be optimized to provide sufficient image quality, color palettes and color depth, with minimal file size.

(3) Video files provide much more temporal granularity (resolution) than is typically needed for generating ABIFs. For example, most video files present video in 20-30 frames per second, and the differences in the images between temporally adjacent frames are typically imperceptible. The use of images files provides sufficient temporal resolution for the user to decide which frames they would like to use in the ABIF while reducing the client processing device processing and communication network bandwidth requirements.

Further, in embodiments wherein the ABIF is generated from the images provided to the client processing device, the use of such image files permits precise frame rates, color palettes, and numbers of colors that permit the fidelity of the images to be preserved without the compression artifacts that can result from compressed video. Image files of higher resolution can also be manipulated, resulting in ABIFs of higher quality. In embodiments wherein the image files are only used to permit the user to select which frames of the media program are to be used in generating the ABIF, the use of image files permits lightweight and rapid operation.

(4) It is desirable to permit ABIFs to be presented by a variety of widely available browser video players, which are typically implemented by browser plug-ins. However, such video players typically restrict access to the underlying streams in ways that frustrate such presentation. For example, it is desirable to embed short GIFs (graphical interchange format) on YOU TUBE video players, so they can be aggregated to a playlist for marketing purposes. However, YOU TUBE does not permit the video streams to be accessed in that fashion. This problem is avoided by presenting a plurality of images in a browser overlay mimicking the YOU TUBE video player. For browsers that do not permit overlaying (for example, IOS systems used in IPHONEs) dedicated applications downloaded and installed onto the client computing device 102 can be used to present the same functionality.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
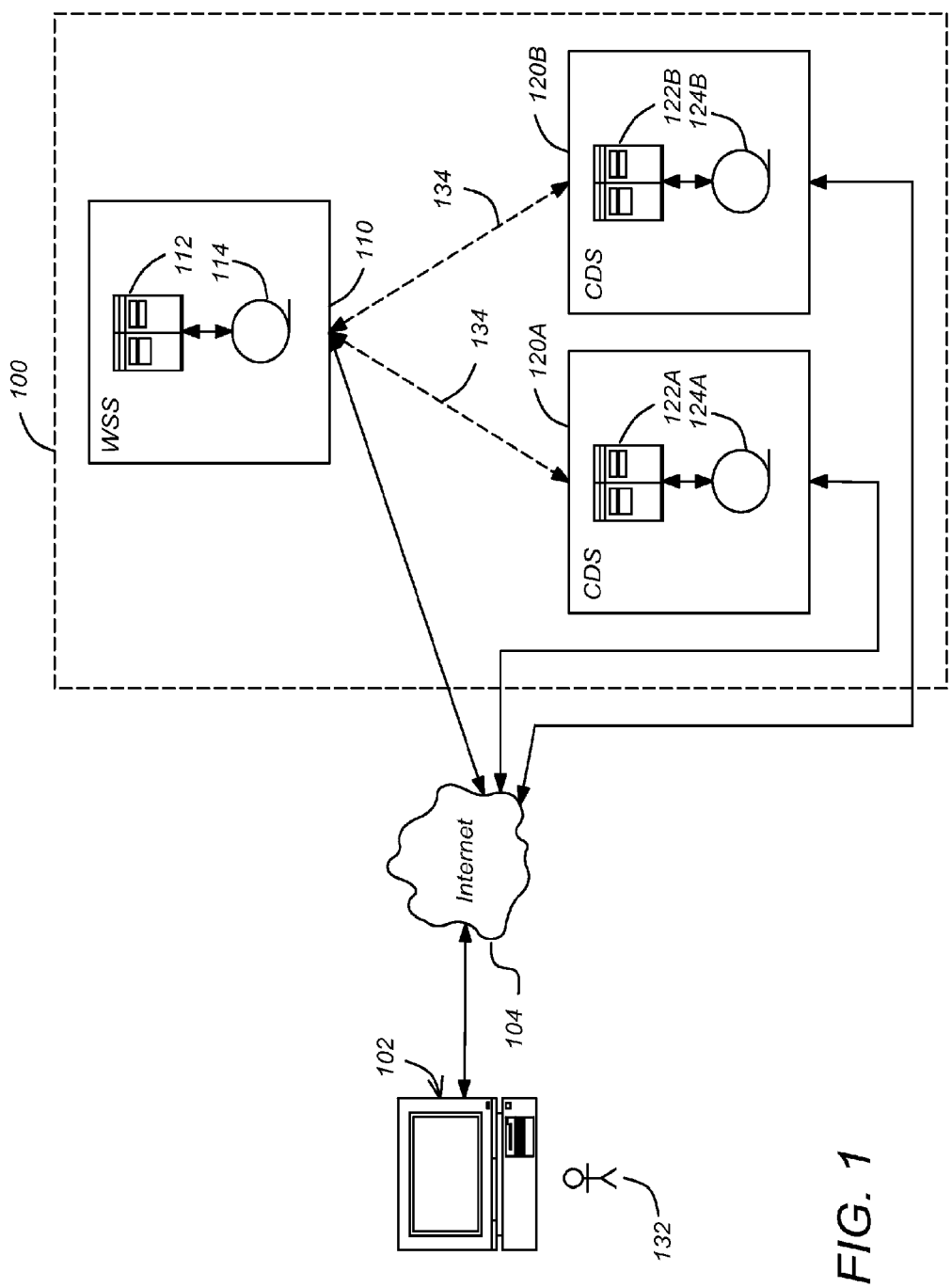
FIG. 1 is a diagram illustrating an exemplary CDN and related elements.

FIG. 1 is a diagram illustrating an exemplary CDN 100 and related elements. In the illustrated embodiment, the CDN 100 may comprise one or more streaming media server systems 120A, 120B, communicatively coupled to a communication network 104 such as the Internet and each having one or more streaming media servers 122A, 122B communicatively coupled to one or more media program databases 124A, 124B storing the media programs to be delivered. The media program system 100 further comprises a web server system (WSS) 110, communicatively coupled to the communication network 104, and having one or more web servers 112 and associated database 114. The foregoing elements can also be implemented in a single system and server using a single computer, if desired. Web server systems 110 control the streaming by issuing commands to and receiving responses from the media server systems 120 via communication links 134.

Using the client processing device 102 such as computer 102, remote users 132 can communicate with the media program provider 110, to obtain media programs (including video-on-demand and/or streaming video services) and to search the provider media program database 114 to find media programs of interest.

Figure 2:
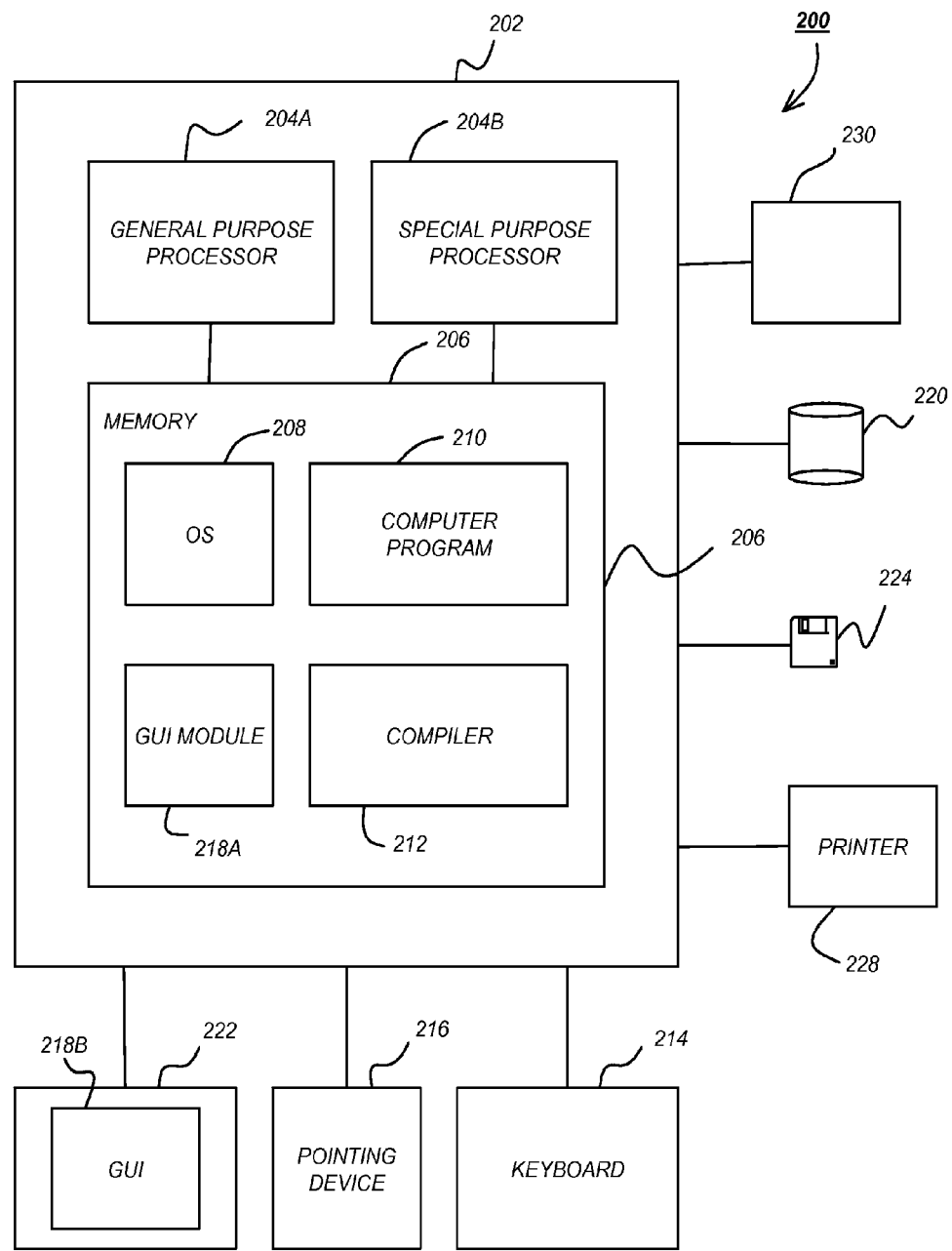
FIG. 2 is a diagram illustrating an exemplary computer system that could be used to implement elements of the present invention.

FIG. 2 is a diagram illustrating an exemplary computer system 200 that could be used to implement elements of the present invention, including the client computer 102, servers 112, 122 and the databases 114, 124. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 332 and/or other devices to accept input and commands and, based on such input and commands and the instructions defined by the computer program 210 and operating system 208 to provide output and results.

Output/results may be presented on the display 222 or provided to another device for presentation or further processing or action. In one embodiment, the display 222 comprises a liquid crystal display (LCD) having a plurality of separately addressable pixels formed by liquid crystals. Each pixel of the display 222 changes to an opaque or translucent state to form a part of the image on the display in response to the data or information generated by the processor 204 from the application of the instructions of the computer program 210 and/or operating system 208 to the input and commands. Other display 222 types also include picture elements that change state in order to create the image presented on the display 222. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 210 instructions may be implemented in a special purpose processor 204B. In this embodiment, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and/or the compiler 212 are tangibly embodied in a computer-readable medium, e.g., data storage device 220, which could include one or more fixed or removable data storage devices, such as a ZIP drive, floppy disc drive 224, hard drive, compact disk read only memory (CD-ROM) drive, tape drive, or a FLASH drive. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 202.

Although the term "computer" or processing device is referred to herein, it is understood that the computer may include portable devices such as cellphones, portable MP3 players, video game consoles, notebook computers, pocket computers, tablet computers, or any other device with suitable processing, communication, and input/output capability.

Figure 3:
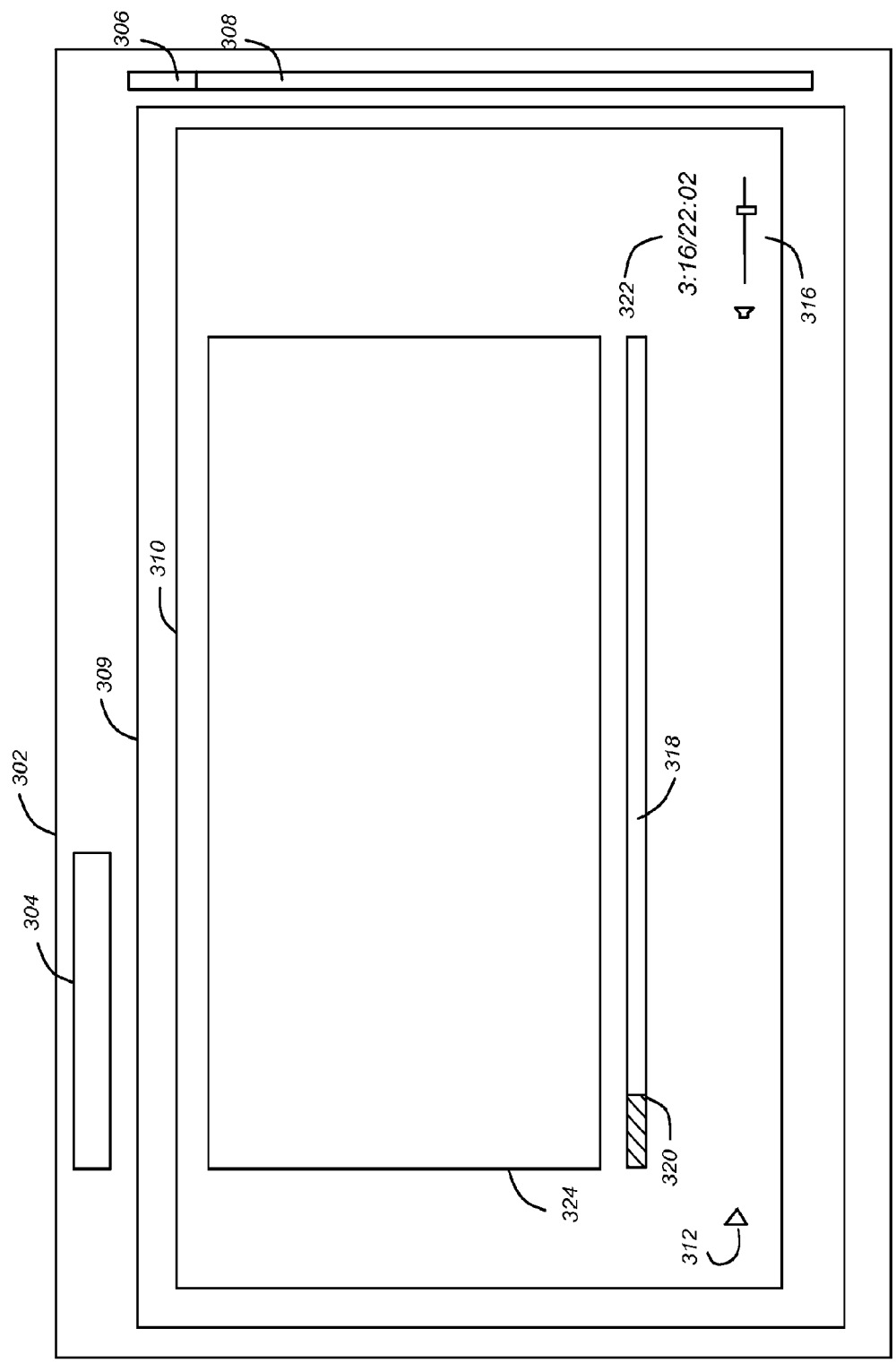
FIG. 3 is a diagram of an exemplary browser presenting an example of rendered webpage implementing a media program player.

FIG. 3 is a diagram of an exemplary browser 302 presenting an example of rendered webpage 309 implementing a media program player 310. A webpage 309 is an image manifested on a computer display, the contents of which is determined by executing a file that comprises source code (alternatively referred to hereinafter as "webpage source" or "webpage source code") that is typically expressed in a markup language such as HTML (hypertext markup language) using a plurality of textural characters. When the source code is read and interpreted by the browser implemented on the computer (described further below), a browser 302 generates data which is presented in the webpage on a display communicatively coupled to the computer. In one embodiment, the webpage source code is a text file that comprises text describing content as well as commands that describe how the content is to be presented (e.g. by including one or more sets of HTML tags that describe how the text should be formatted when presented by the browser 302) and where the content may be obtained. The commands may also include commands for generating webpage controls that are used to activate certain webpage functionality.

In the illustrated embodiment, the browser 302 has an address field 304 for entering the universal resource locator (URL) of websites and webpages of interest. The browser 302 may also have a scroll bar 308 and an associated scroll control 306 to allow different portions of the webpage 309 to be displayed.

In the illustrated embodiment, webpage 309 also includes an embedded media program player 310. The embedded media player 310 can be used to play media programs that are downloaded, streamed, or progressively downloaded from a host website (e.g. the website hosting the currently viewed webpage) or third party websites. This can be accomplished by including appropriate embedded media player 310 instructions into the webpage source. Typically, such instructions include a link to the URL of the media program depicted by the media program player 310 or the webpage 309.

The embedded media program player 310 may include a play area 324 for displaying the media program, a play control 312 for playing and pausing the playback of the media program, a progress bar 318 having a progress annunciator 320 showing the temporal progress of the playback of the media program, a timer 322 showing the current temporal location of the playback of the media program and the total time of the media program, and an audio slider 316 for adjusting the volume of the played back media program. Using the pointing device 216 or keyboard 214, the progress bar or annunciator 320 can be selected and moved to temporally different portions of the program, allowing the user to move to any desired temporal point in the media program.

Figure 4:
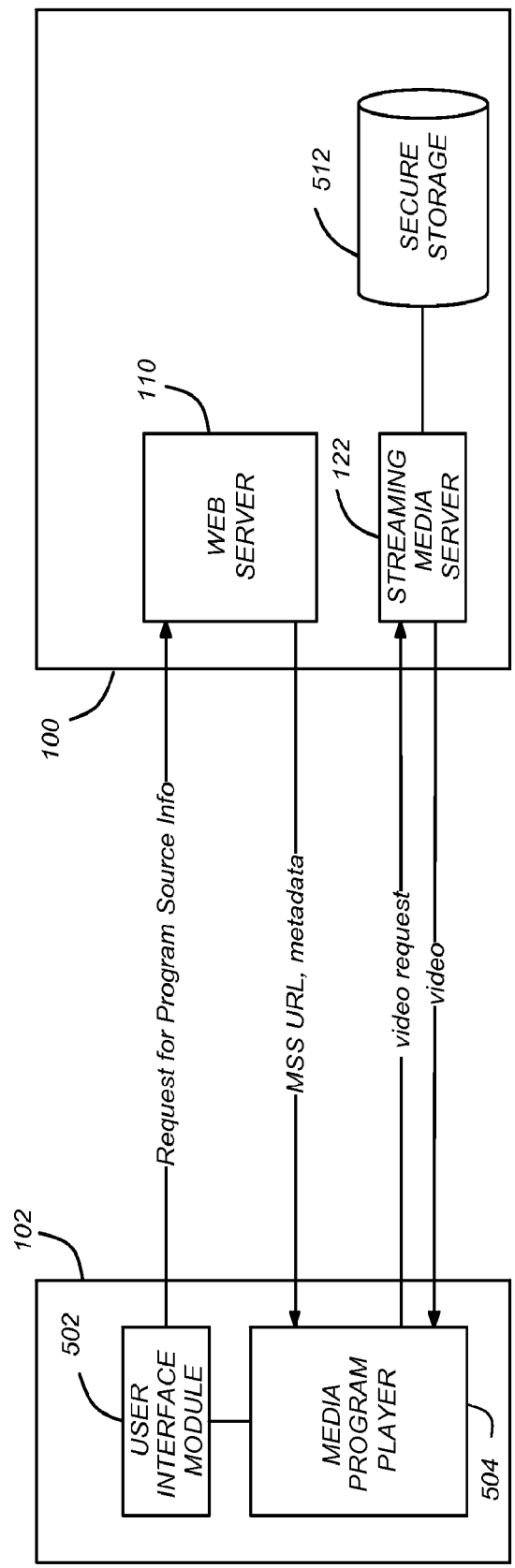
FIG. 4 is a diagram further illustrating one embodiment of how the CDN can be used for the provision of media programs in response to a media program request.

FIG. 4 is a diagram further illustrating one embodiment of how the CDN 100 can be used for the provision of media programs in response to a media program request. The user computer 102 may include an interface module 402 and a media program player 404. The interface module 402 includes instructions performed by the user computer 102 that are used to present information to the user 132 and to accept user input, including commands. The interface module 402 may also be integrated with the media program player 404. The presented information may include a program guide, advertisement options, and the user input may include selected advertisement options and media program playback selections.

Using the user computer 102 and the interface module 402, the user 132 enters a choice for a media program. Typically, the user computer 102 is provided a webpage having elements which, when selected, transmit a request to the CDN 100.

The user interface module 402 transmits a request message to the CDN 100 for information regarding how the requested program may be obtained from the streaming servers in the CDN. This information may take the form of a media program identifier or a universal resource locator (URL) where the media program may be obtained.

The information (hereinafter, URL) is then transmitted to the media program player 404. The media program player 404 provides a video request to the media server 114 at the URL received from the content selector 408. The video request includes the program identifier (PID) and may include other information as well. The video request may be for streaming or progressively downloading the requested media program.

The streaming media server (SMS) 122 responds to the video request by providing the media program to the user computer 102. The SMS 122 obtains the media program from secure storage 124. The media program is transmitted (e.g. via streaming) to the media program player 404.

Figure 5:
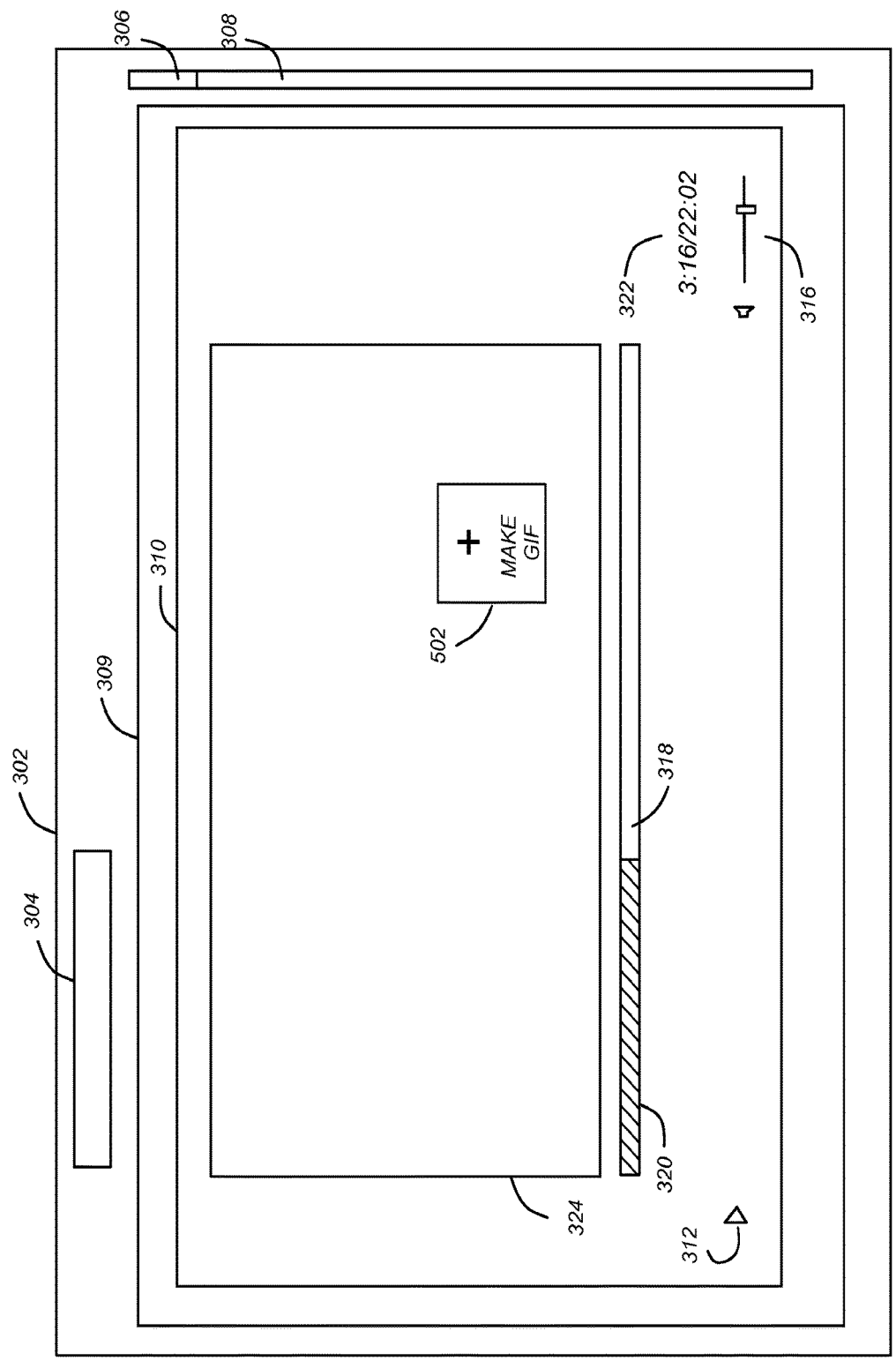
FIG. 5 is a diagram illustrating one embodiment of the media program player providing a media program.

FIG. 5 is a diagram illustrating one embodiment of the media program player 310 providing a media program. The media program player 310 may be implemented in the webpage 309 or the media program player 310 may be separately implemented. The media program player 310 includes features that allow for convenient, one button creation of an animated bitmap image file (ABIF) such as a file complying with the graphical interchange format (GIF). This control may be implemented in HTML or flash, and may take the form of the illustrated AIBF button 502. The AIBF 502 may be presented concurrently with the media program in the play portion 324 of the media player 310 or elsewhere.

Figure 6:
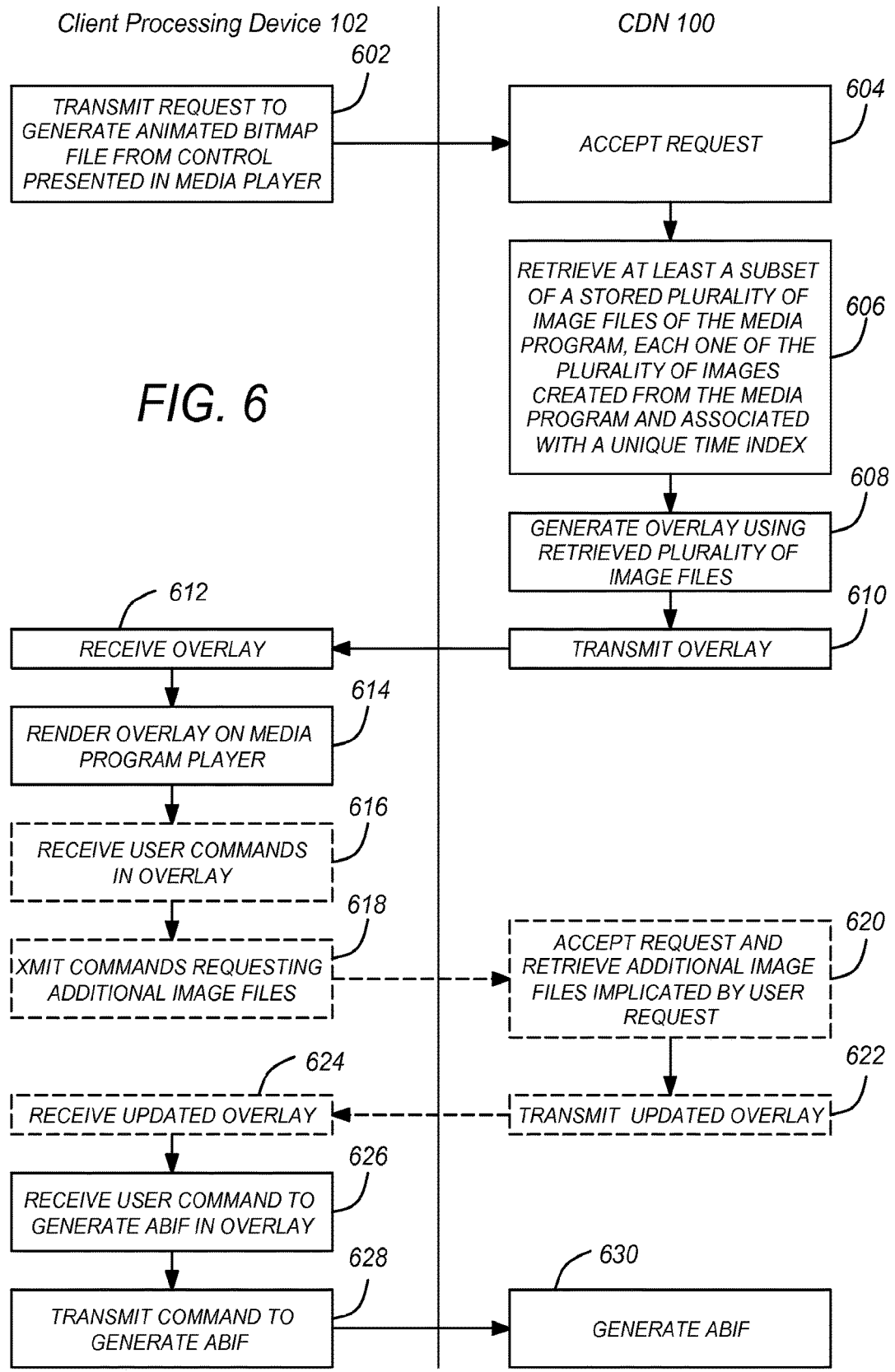
FIG. 6 is a diagram of illustrative method steps that can be used to generate the ABIF.

FIG. 6 is a diagram of illustrative method steps that can be used to generate the ABIF. In block 602, a request is transmitted from the client processing device 102 to the CDN 100 to generate the ABIF. This can be accomplished by user selection of the ABIF control 502 illustrated in FIG. 5. The CDN 100 accepts the request as shown in block 604, and retrieves at least a subset of plurality of image files of the media program, as shown in block 606. The plurality of image files may have been generated in advance of the ABIF request, or in real time in response to the ABIF request, as further described below. In one embodiment, the plurality of image files are portable network graphics (PNG) files, although other graphic file types (e.g. bitmaps or BMPs, JPEGs (joint picture experts group), and TIFF or TIFs (tagged image file)) may be used.

Images encoded according to the PNG standard have advantages over JPEGs. First, PNGs offer lossless or substantially lossless compression. This avoids the blocking and pixelating that is common with JPEGs. While such blocking is typically invisible with in photographs of ordinary subject matter, it may result in jagged edges and lines in animation. Further, animation frames typically have large areas of one color and gradient, and blocking is easier to detect in such areas. Hence, for animations, PNGs are typically preferred over JPEGs. Also, unlike JPEGs, PNGs offer variable transparency, and so may be overlaid over other images so that both images are at least somewhat visible. However, the greater compression afforded by JPEGs is beneficial where image frames are created from non-animation images and where transparency is not needed.

Figure 7:
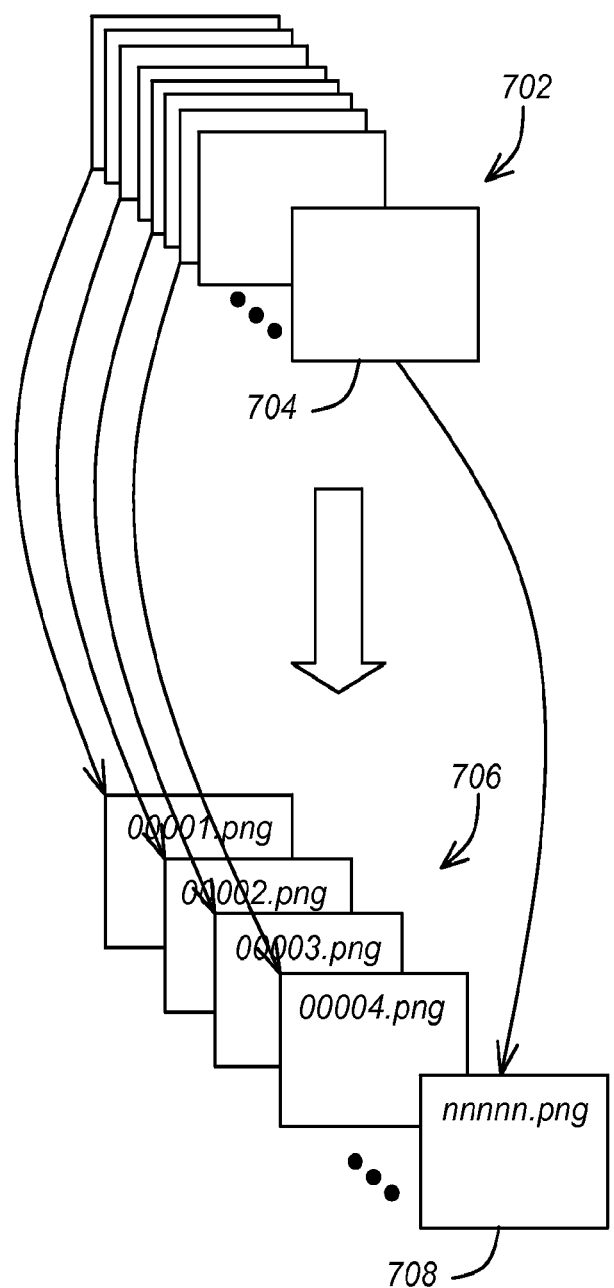
FIG. 7 is a diagram illustrating one embodiment of the generation of the plurality of image files.

FIG. 7 is a diagram illustrating one embodiment of the generation of the plurality of image files. The media program 702 comprises a plurality of ordered frames 704, which, when presented in sequential order, present the content of the media program giving the illusion of smooth motion of objects between the frames 704. A plurality of sequential ordered image files 708 are created from the ordered frames 704 of the media program.

To enable the transport and storage of media programs by commercially viable means, the media video programs are typically compressed using both spatial and temporal compression techniques such as those used in the motion pictures expert group (MPEG) or H.263, H.264, or H.265 standards. Spatial compression eliminates or reduces intra frame (within the same frame) redundancies, while temporal compression eliminates or reduces inter-frame (frame-to-frame) redundancies. Advanced coding techniques can also operate on a sub-frame (slice) basis. In such systems, the compressed video comprises a group of pictures (GOP), each comprising an intra-frame (I-frame) as well as some combination of predictive frames (P-frames) and bi-predictive (B-frames). Because they are only spatially compressed, each I-frame can be decoded independently from other frames, and each I-frame provides sufficient information to create an image file, while P-frames and B-frames must obtain information from other frames in the GOP to be decoded. The GOP length (temporal distance between I-frames may be adaptively and dynamically selected, but is typically about 15-18 frames. Even when frame-to-frame differences are small and predictive or bi-predictive coding may be appropriate, limits are typically placed on GOP size, because of limits in coder buffer size, data recovery times. Typically, seeking within a coded video file is accomplished using I-frames as reference points, so seek times may also place limits on the GOP size. Accordingly, the process of generating image files from video files may comprise decompression of I-frames alone, or decompression of P-frames and B-frames. Decompression of P-frames and B-frames into image files is typically more computationally intensive, but such decompression permits the sequence of generated images to be equally spaced in time. Equal temporal spacing may also be achieved by judicious choice of the coding parameters selected when the video file is coded. For example, in addition to copies of the media program that are provided for streaming, specially coded copies may be obtained for purposes of generating ABIFs. Such copies may utilize I-frame only compression. Such compression is very fast, but can produce file sizes three or more times larger than media files using temporally and predictively compressed P-frames and B-frames. However, once such a media file is generated and stored, generation of image files from any of the frames becomes a simpler (and more rapid) process, and closer to a lossless ideal, resulting in higher quality images.

If the frames of the video program are uncompressed or only spatially compressed (e.g. not temporally compressed), they may be decompressed and one or more of the frames 704 of the media program 702 can be converted to one or more image files 708. Or, the already compressed frame can be further compressed, or transcoded into a format suitable for the image files.

An image file 708 can be created for each and every decompressed frame 704 of the media program, or an image file can be created for every N media program frame, wherein N is an integer greater than one. In one embodiment, the temporal spacing of the created image files 708 is varied to account for motion within the media program itself (with more image files per second of the media program being created for media program frames 704 depicting greater motion).

In one embodiment, the frames may be created from the media program using a transcoder such as FFMPEG (fast forward MPEG), software published under the GNU (GNU's Not Unix!) lesser public interest license. In a preferred embodiment, the frames are created with a dimension and frame rate suitable for use in generating a GIF. For example, the frames may be 890×500 pixels and produced at a 24 frame per second (fps) rate. FFMPEG can be used to create image files using the following command structure:

ffmpeg A B C D wherein:

| Command Element | | Description |
| --- | --- | --- |
| A | -i VIDEO_SOURCE.mp4 | Input video file |
| B | -s 890 × 500 | Output image file size (pixels) |
| C | -r 24 | Frame rate to create frames |
| D | -f image2./FRAMES_DIRECOTRY/%05D.png | Create a sequence of images in the FRAMES directory with 5 digit file names. |

The image files are then further processed to optimize the resulting expression of the ABIF. This further processing can include operations to reduce the color depth of the image to a smaller color palette (e.g. 64 colors), to reduce the bit depth from 24 to 8, to disable dithering (e.g. of the colors) so that the resulting image files are not grainy and to keep the file compact. This can be accomplished with a MOGRIFY utility using IMAGEMAGICK using the following command structure mogrify A B C D wherein:

| | Command Element | Description |
| --- | --- | --- |
| A | -colors 64 | Reduces the image to a 64 color palette |
| B | -depth 8 | Reduces bit depth from 24 to 8 |
| C | -dither none | Prevents grainy frames and assures compact file sizes |
| D | -/FRAMES/*.png | Process all files in the FRAMES directory |

The reduction of the color palette size is beneficial because some ABIF formats (GIF, for example) have limited color palette (for example, GIFs are limited to an 8 bit palette, allowing for 256 colors). Further reductions of the color palette to 64 colors are also advantageous.

In one embodiment of the invention, the ABIF itself is later generated from the image files 708 stored in the CDN 100, based upon the image files 708 that the user selects using the client processing device 102, the identity of which is communicated to the CDN 100 when the user wishes to generate the ABIF. To minimize the bandwidth and capacity requirements of the communications link 104, the images actually transmitted to the client processing device 102 may be further compressed, while the images with less compression remain stored in the CDN 100. This provides the client processing device 104 with images sufficient for designating which images are desired to be used in the ABIF, but allows the CDN 100 to generate the ABIF with the higher quality (less compressed) images.

As described below, other embodiments are possible wherein the ABIF itself is generated directly from the media program file. However, the media program file is typically too large to efficiently transmit to the client processing device 102, and the client processing device 102 typically has insufficient memory and processing capability to perform the functions needed to create the ABIF from the media program file. To ameliorate this problem, the images sent to the client processing device 102 are lightweight highly compressed images that are indexed or otherwise correlated to reference their temporally associated portions of the media program, and those indexes are send to the CDN 100 to generate the ABIF directly from the video media file rather than from still images.

The frames used to generate the images can be created directly from FLASH, ENCORE, MEDIA ENCORE and other products available from the ADOBE CORPORATION. In such case, further processing may be reduced as such tools permit the definition of frame size, bit depth and the number of color palettes.

The image files 708 are then correlated with the media program, so that any particular image file 708 can be uniquely associated with a particular portion of the program. This correlation can be expressed by an index such as a time index expressing a temporal correlation between the media program frames and the image files 708. The index may be stored as metadata within each image file, with a group of image files (e.g. ABIF index data), or may be contained within or inherent to the filename of the image file 708. For example, FIG. 7 depicts an embodiment wherein a PNG is generated for every other media program frame 704, and the name for each PNG file is sequential, beginning with 00001.png for the first frame of the media program, and a number nnnnn.png for the last frame. In this instance, a mapping function or table can be used to correlate the file name of the PNG file to the temporal location of the associated frame of the media program 702. Alternatively, the PNG file may be of the form HHMMSSKK.png wherein HH, MM, and SS refer to the number of hours, minutes and seconds since the beginning of the media program, and KK refers to hundredths of a second.

Typically, the generation of the image files 708 takes place in advance of the request to generate the ABIF, but the process may be automated to permit the generation of the image files 708 in response to the receipt of the request from the client processing device 102. As further discussed below, a typical ABIF includes in the order of 32 images, so the time and processing required to generate the image files 708 for a particular user ABIF may be sufficiently small to permit generation of the image files 708 on demand. Further, image files 708 generated on demand may be saved for later use by other users.

Returning to FIG. 6, M of the stored plurality of image files are then retrieved, as shown in block 606. The number of retrieved image files M can vary depending on CDN or client processing device preferences or commands. In one embodiment, when responding to the initial request to generate the ABIF, the CDN 100 retrieves a sufficient number of image files 708 to generate an ABIF with a sufficient amount of motion. In one embodiment, 32 image files are retrieved in response to the initial request. In one embodiment, the M retrieved image files are temporally centered on the temporal location of the media program image frame currently being played when the request is received. In other words, referring back to FIG. 3, it is noted that the portion of the media program being played back is 3:16 into a media program 22:02 in length, as indicated by the timer 322 and the progress annunciator in the progress bar 318. In this instance, the M retrieved image files may be temporally centered at 3:16. In this embodiment, when the user selects the ABIF generation control 502 of FIG. 5, the result is the generation of 32 image files temporally centered at 3:16.

In blocks 608 and 610, an overlay is generated and transmitted to the client processing device.

Figure 8:
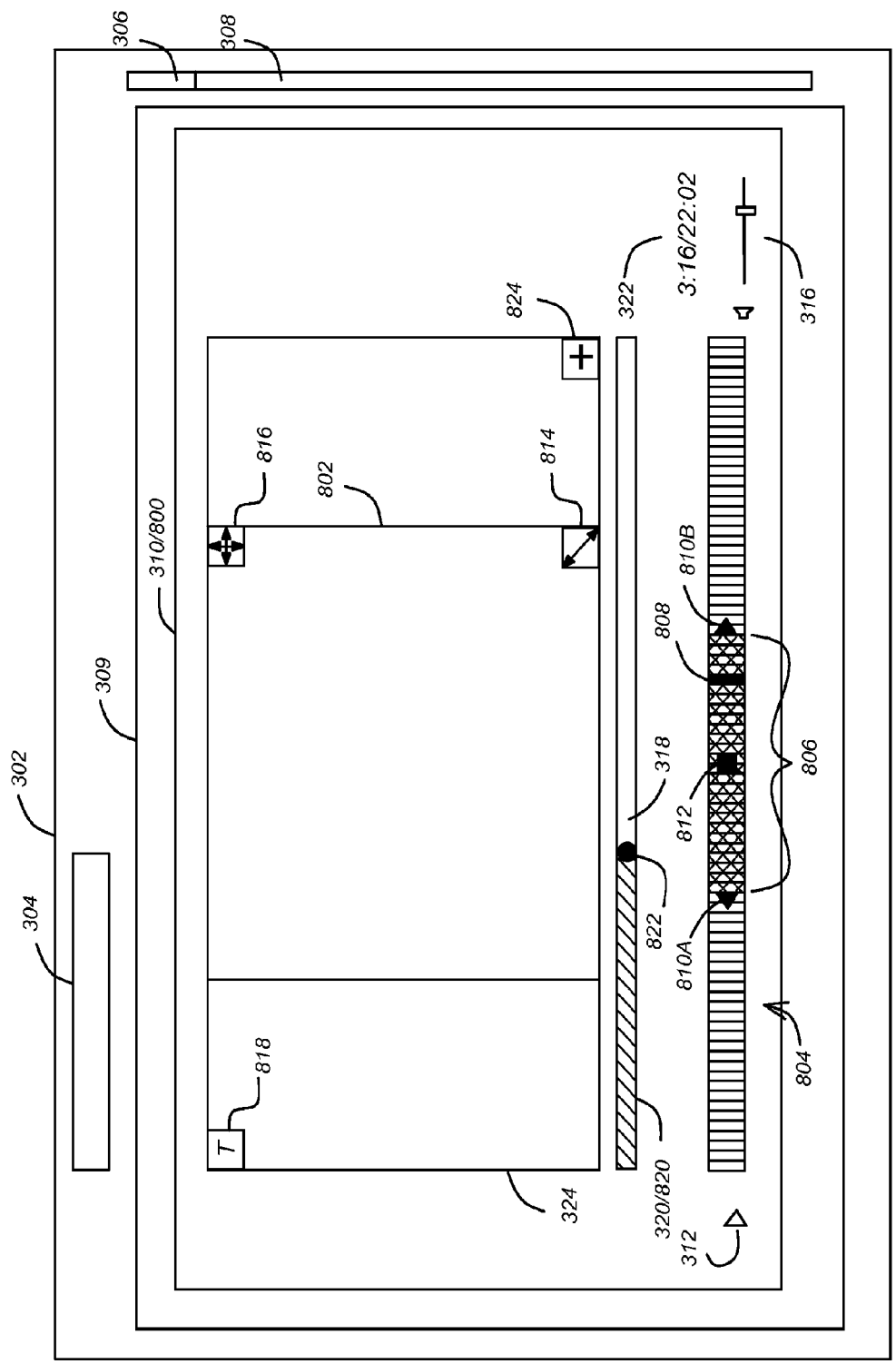
FIG. 8 is a diagram illustrating one embodiment of the overlay.

FIG. 8 is a diagram illustrating one embodiment of the overlay 800. In one embodiment, the overlay 800 is substantially spatially coextensive (e.g. the same size and dimensions) as the media program player 310, hence, the overlay 800 in FIG. 8 is labeled as coincident with the media program player 324. The overlay 800 may include elements that mimic elements in the media program player 310, including the ABIF media program progress bar progress bar 420 (e.g. in the same location and with the same appearance), but permitting additional functionality, as further described below. The overlay may also mimic other elements for non-functional purposes.

The user of the overlay for this functionality is particularly advantageous because it permits the functionality to be added to any media player browser, without requiring media player or browser modifications.

The overlay 800 includes an ABIF image window 802 presenting a visual depiction of each of the image files 708 that will be used to generate the ABIF. In one embodiment, when the overlay is initially presented, each of the image files 708 are sequentially presented in order, then looping back to the first of the image files 708 to begin the process anew, thus giving the appearance of the media program looping through each of the media program frames 704.

The overlay 800 also includes an image navigation control 804 such as ABIF progress bar, which presents a graphical depiction of the temporal relationship between the retrieved image files 708. In the illustrated embodiment, each image file 708 is indicated by a small element 808. Those retrieved image files that are currently selected for the ABIF are indicated by the ABIF progress bar duration indicator 806, which shades or otherwise delineates the elements 808 associated with those image files differently than the elements 808 for the other image files. The element associated with the image frame being currently displayed on the ABIF window 802 may also be shaded differently than the other elements in group 806. For example, in the illustrated embodiment, element 808 is blackened to indicate that this element 808 is the one associated with the image file 708 currently depicted in the ABIF window 808. Further, as the image files 708 are presented in the ABIF window 802 in rapid succession (thus mimicking a continuous loop of the media program over the same time interval as an ABIF would present), the element associated with the images can be blackened one at a time. Elements 808 can also be selected to select one of the image files for display in the ABIF window 802. As illustrated, image navigation control is a linear series of control elements 808, and therefore provides for operation analogous to a slider control or progress bar.

The overlay 800 also includes a resize control 814 that can be used to resize the size of the ABIF window 802, and a move control that permits motion of the ABIF window 802 within the media playback area 324. Use of the resize 814 control and move control 816 allows the user to control location and size of the ABIF window 802, thus selecting any spatial portion of the media program for ABIF generation. The resulting ABIF may be reduced in size (pixels) or may be the same number of pixels, but accordingly scaled in size. The overlay 800 also includes a text control 818 that allows the user to add text to the ABIF.

The ABIF progress bar 804 includes image navigation controls 810A, 810B and 812. Navigation control 810A permits the user to select image files preceding the temporal first image file that was retrieved for inclusion in the generated ABIF. Similarly, navigation control 810B permits the user to select image files after the temporal last image file retrieved for inclusion in the generated ABIF. Thus, the user can reduce or increase the number of image files 708 used to generate the ABIF. Or, navigation controls 810A and 810B can be used to select from image files already retrieved for inclusion in the ABIF. For example, the image files associated with elements to the right of control 810B may have been retrieved by the client processing device 102, but by virtue of being outside the bounds described by controls 810A and 810B, not currently designated for inclusion in the ABIF. Selecting control 810B and moving it to the right would command that the images associated with the now included elements be included in the ABIF.

Similarly, center image navigation control 812 can be used to move the ABIF progress bar duration indicator 806 and thus select different image files 708 for inclusion into the ABIF. For example, selecting the navigation control 812 and dragging it to the left causes the selected image files to include the same number of image files, but shifted to a temporally earlier time. Thus, the center image navigation control 812 indicates the temporal center of the retrieved subset of image files. The center image navigation control 812 may move as controls 810A and 810B are moved, thus changing the temporal center of the frames delineated therein.

The ABIF generator can be implemented such that all of the image files associated with each of the buttons 808 of the entire ABIF progress bar 804 are retrieved in response to the initial command from the client processing device 102. This permits the manipulation of the navigation controls without requiring any further requests for the retrieval of additional image files. Or, the ABIF generator can be implemented so as to request only those image files that are within the ABIF progress bar duration indicator 806, with other image files 708 retrieved as the controls 810A, 810B, and 812 dictate.

The overlay 800 may also include a ABIF navigation bar 820 that can be used to rapidly select other media files associated with other portions of the media program. For example, control 822 can be used to select image files 708 associated with different parts of the media program, by moving the control 822 to another location on the progress bar 820. Once moved, image files 708 associated with the selected portion of the media program are retrieved and presented to the user, the ABIF progress bar 804 is updated to reflect the newly retrieved image files 708, which are typically centered around the temporal point within the media program as indicated by the position of the control 822 along the ABIF navigation bar 820. Control 822 can therefore be used to navigate the ABIF generator to any portion of the media program.

The acceptance of any of the foregoing user commands, transmission of commands to the CDN 100 and the receipt of the updated overlay 800 reflecting those user commands is depicted in blocks 612-624 of FIG. 6.

When the user is satisfied with the selectable aspects of the ABIF presented on the overlay 800, they may select a control such as the ABIF generation control 824. The client processing device 102 receives the user command from the overlay, as shown in block 626 of FIG. 6, and transmits a user command to generate the ABIF to the CDN 100, as shown in block 628. Thereafter, the CDN 100 generates the ABIF, as shown in block 630.

As described above, this can be accomplished using the image files 708 transmitted to the client processing device 102, higher resolution versions of the image files 708 transmitted to the client processing device 102, or directly from the video media program file. Information required to generate the ABIF may include: (1) a path to the video media program file itself, (2) text to be added to the images in creating the ABIF, thus producing an ABIF with text annotations, (3) cropping and resizing dimensions (for example, as determined by use of controls 816 and 814, (4) optional compression settings and/or output dimensions (e.g. 500× 500 pixels) and (5) information sufficient to identify the image frames or temporal portions of the media program to be used in the ABIF (e.g. the index associated with the image frames, time codes associated with the start and end times of the media program associated with the desired image frames, or time code associated with the temporally first desired image frame, and a duration).

In one embodiment, the generation of the ABIF is generated directly from the video media program by accepting metadata from the client processing device (1) index information of the desired image frames or range of image frames, converting that index information to the start and ending time codes of the desired temporal portion of the video media program, (2) text to be added to the GIF, (3) crop and positioning dimensions (the image is cropped or repositioned). The CDN 100 then generates the ABIF using FFMPEG or similar utility using an appropriate command. Use of FFMPEG in producing both the images transmitted to the client processing device 102 and to generate the ABIF allows the indexing of the image files to be more easily correlated to the temporal portions of the media program.

Figure 9:
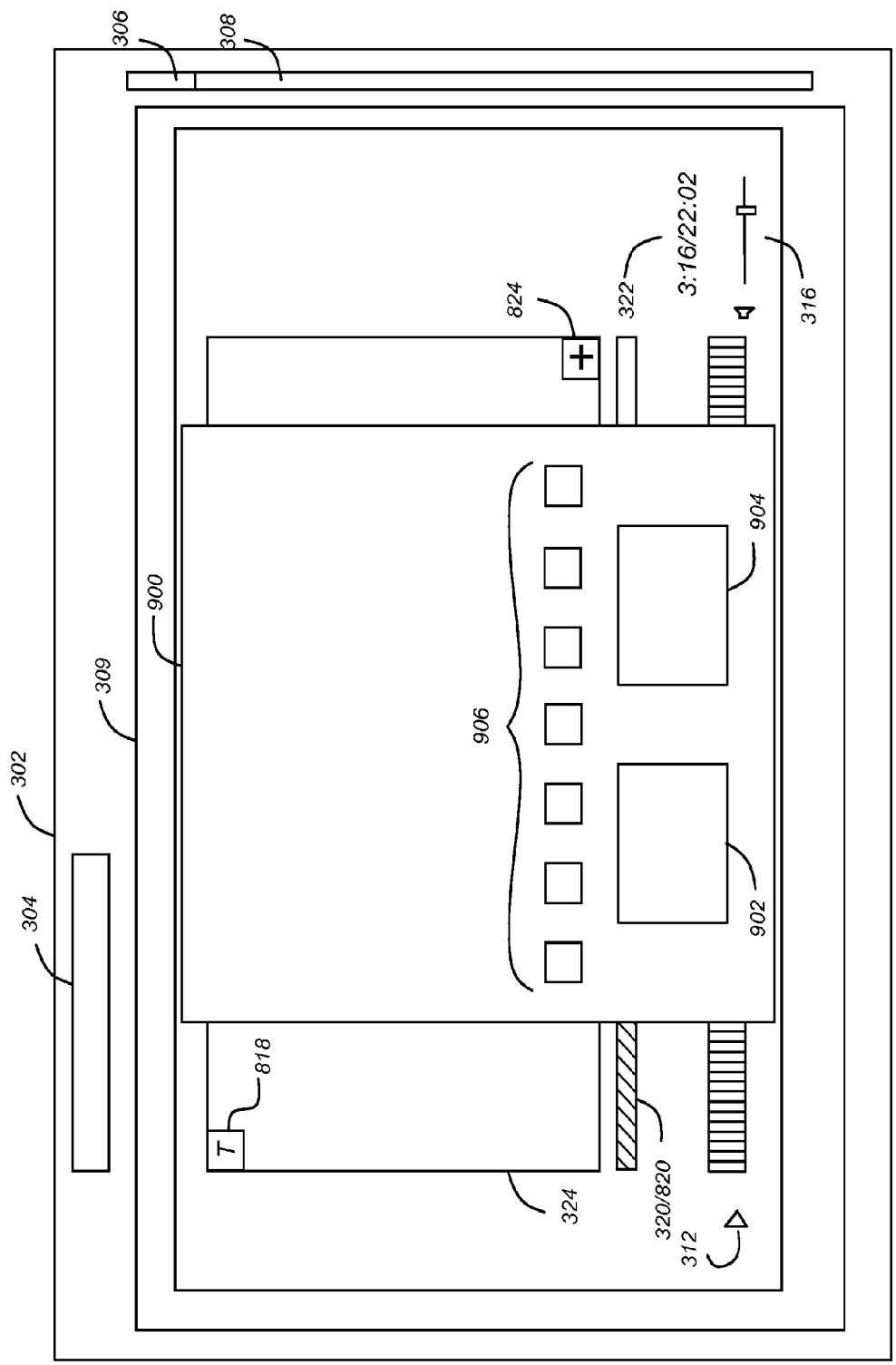
FIG. 9 is a diagram illustrating one embodiment of a further overlay.

FIG. 9 is a diagram illustrating one embodiment of a further overlay 900 that may present a first control 902 which allows the user to return to the playback of the media program, and a second control 904 that allows the user to view the ABIF on the further overlay 900 or another overlay. Further overlay 900 may also include controls 906 that permit the user to share the generated ABIF, whether by FACEBOOK, TWITTER, e-mail or a generated link such as a URL. In one embodiment, the ABIF can be provided as a file to the client computer 102, or can be retained by the CDN 100 with access provided by the appropriate URL.

Distributed Content Delivery Network

The foregoing operations of responding to user requests to generate ABIF files, especially when the still images used to generate the ABIF files are generated from video files on the fly based on user requests can be computationally intensive and result in substantial delays.

Figure 10:
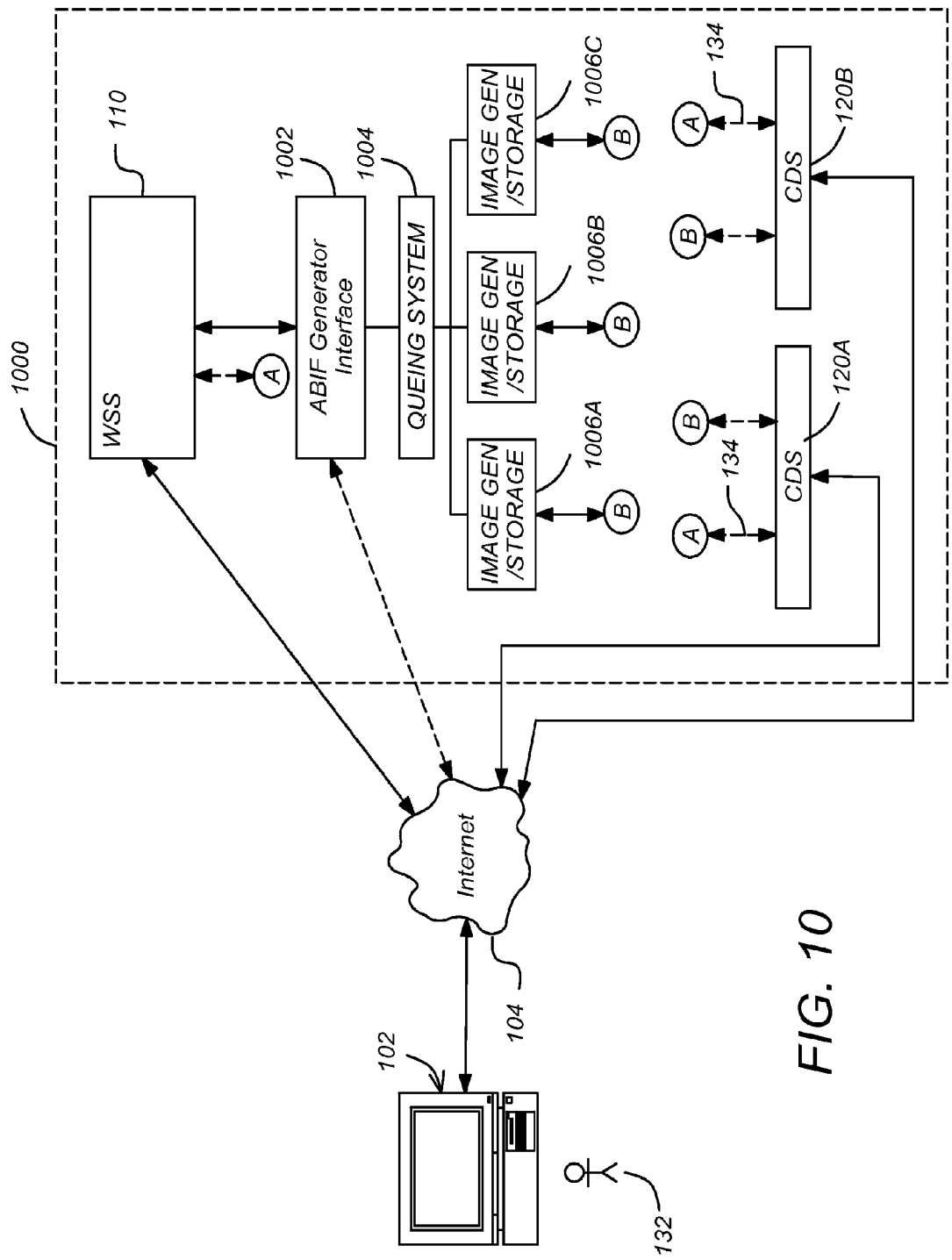
FIG. 10 is a diagram describing an embodiment of a distributed CDN.

FIG. 10 is a diagram of an exemplary embodiment of a distributed content delivery network (DCDN) 1000. The DCDN 1102 includes an ABIF generator interface 1002 communicatively coupled to queuing system 1004, which controls the operation of a plurality of processing/storage devices 1006A-1006B that generate and store the images used to generate the ABIFs, as well as generating the ABIFs from the images. The interface 1002 is a light weight front end server that, after the request to generate an ABIF is received as shown in block 602 of FIG. 6, communicates with the client processing device 102 to transmit the webpage instructions that result in the display of the interface of FIG. 8 on the browser, including the overlay. The interface 1002 also receives commands, and instructions from the client processing device 102 (e.g. in the form of manipulating and selecting elements presented to the user in the browser) and processes or routes such commands to the appropriate entity to perform the function implicated by the command. For example, in response to the initial user request to generate an ABIF, the interface 1002 transmits instructions to the client processing device 102 implementing the a lightweight GIF maker interface illustrated in FIG. 8.

The DCDN 110 also includes a queuing system 1004. The queuing system 1004 monitors the interface 1002 for ABIF generation requests (e.g. as shown in block 602 of FIG. 6), and manages the process of rendering images from video files or finding and recalling previously produced images from video files. The queuing system a 1004 can also manage the production of ABIFs from those images (e.g. responding to the ABIF generation request illustrated in block 628 or requests to generate additional image files as shown in block 618). The queuing system 1004 queues such requests and determines which requests will be fulfilled, and in which order, and assigns one of a plurality of communicatively coupled image generation and/or storage systems 1006A-1006C to generate the image/ABIFs. In one embodiment, the image/ABIF generation is accomplished by retrieving video files from media server systems 120 or from other storage devices in or external to the DCDN 110. After the image generation is completed, elements 1006A-1006C report when the image/ABIF generation is completed, and send a message to the queuing system 1004, which reports this status to the interface 1002.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of generating an animated image file from a video media program file depicting a media program, the media program file comprising a sequence of images, comprising:

accepting, in a content distribution network, a request to generate the animated image file, the request accepted from a client processing device remote from the content distribution network via a control presented in a media player while presenting at least a portion of the media program in a media program presentation area of the media player, the media player implemented by the remote client processing device;

in response to the accepted request, retrieving at least a subset of a plurality of image files of the media program stored by the content distribution network, each of the plurality of image files having only one static image and created from at least one image of the sequence of images and associated with a unique index;

transmitting the retrieved at least a subset of plurality of image files to the client processing device;

transmitting an overlay for presentation by a browser over the media player, the overlay comprising:

an image window for presenting the at least one of the retrieved subset of the plurality of image files, the image window substantially spatially co-extensive with a viewing area of the media player;

a first image navigation control, for graphically indicating a temporal location of a temporal center of the retrieved subset of the plurality of image files; and a second image navigation control, for selecting a presented image file for presentation in the image window from among the retrieved subset of the plurality of image files, and for graphically indicating the temporal location of the presented image file relative to the retrieved subset of image files, and also for selecting one or more of the retrieved subset of image files for the generating of the animated image file;

accepting, in the content distribution network, a command entered via the overlay to create the animated image file, the command comprising one or more of the indexes specifying the selected one or more of the retrieved subset of image files; and generating, in the content distribution network, the animated image file based upon the one or more of the indexes specifying the selected one or more of the retrieved subset of image files.

2. The method of claim 1, wherein the overlay substantially mimics the presentation of the media player.

3. The method of claim 2, wherein the image window automatically sequentially presents each of the retrieved subset of the plurality of image files, one at a time.

4. The method of claim 1, wherein:

the second image navigation control comprises a series of elements, each element representing an associated one of the retrieved subset of the plurality of image files; and the presented image file is selected by selecting the one of the series of elements associated with a user-selected image file.

5. The method of claim 1, wherein:

the one or more of the indexes comprises a time index specifying the selected one or more of the retrieved subset of image files; and the animated image file is generated according to the time index.

6. The method of claim 5, wherein generating the animated image file based upon the one or more of the indexes specifying the selected one or more of the retrieved subset of image files comprises:

associating the time index with a temporal portion of the media program file; and generating the animated image file from the temporal portion of the media program file.

7. The method of claim 1, further comprising:
accepting a second command via the overlay to select a second subset of the stored plurality of image files of the media program;
retrieving the second subset of the stored plurality of image files;
transmitting a modified overlay, wherein:
the image window of the modified overlay presents at least one of the retrieved second subset of the plurality of image files, the image window substantially spatially co-extensive with a viewing area of the media player;
the first image navigation control of the modified overlay graphically indicates the temporal location of the temporal center of the retrieved second subset of the image files; and
the second image navigation control further selects the presented image file for presentation in the image window from among the retrieved second subset of image files, graphically indicates the temporal location of the presented image file relative to the retrieved second subset of image files, and selects one or more of the retrieved second subset of image files for the generating of the animated image file.

8. The method of claim 1, further comprising:
accepting a third command entered via the overlay select a spatial portion of the subset of the stored plurality of image files of the media program; and
generating the animated image file based upon selected one or more of the retrieved subset of image files comprises generating the animated image file using a referenced area of the plurality of image files altered according to the selected spatial portion.

9. The method of claim 1, wherein the plurality of image files is generated from the sequence of images of the media program by:
generating an ordered sequence of frames from the video media program file according to frame size and a frame rate;
determining if the media program is an animation program;
if the media program is an animation program, generating a portable network graphics (PNG) file for each of the ordered sequence of frames; and
if the media program is not an animation program, generating a joint picture experts group (JPEG) file for each of the ordered sequence of frames.

10. The method of claim 9, wherein the video media program file is created according to a format having a plurality of frame types including predictive and non-predictive frame types, and the media program file is created with only non-predictive frame types.

11. The method of claim 1, wherein:
the method further comprises processing the sequence of images to generate the at least a subset of the stored plurality of image files, each of the at least a subset of the stored plurality of images of less file size than the associated image of the sequence of images; and
the animated image is generated from versions of the sequence of images of higher resolution than the subset of the plurality of image files.

12. The method of claim 11, wherein:
the processing the sequence of images to generate the at least a subset of the stored plurality of image files comprises at least one of:
further compression of each of the subset of the stored plurality of image files;
reducing pixel dimension of each of the subset of the stored plurality of image files;
reducing color depth of each of the subset of the stored plurality of image files; and
reducing bit depth of each of the subset of the stored plurality of image files.

13. A system for generating an animated image file from a video media program file depicting a media program, the media program file comprising a sequence of images, comprising:
a content distribution network, comprising:
a server, for accepting a request to generate the animated image file, the request accepted from a client processing device remote from the content distribution network via a control presented in a media player presented executed by a remote client processing device, the media player for playing the media program using the remote client processing device in a media program presentation area;
a queuing system, communicatively coupled to the server, for retrieving, in response to the accepted request, at least a subset of a plurality of image files of the media program stored by the content distribution network, each of the plurality of image files having only one static image and created from at least one image of the sequence of images and associated with a unique index;
wherein the server transmits:
the retrieved subset of plurality of image files to the client processing device;
an overlay for presentation by a browser over the media player, the overlay comprising:
an image window for presenting the at least one of the retrieved subset of the plurality of image files, the image window substantially spatially co-extensive with a viewing area of the media player;
a first image navigation control for graphically indicating a temporal location of a temporal center of the retrieved subset of the plurality of image files; and
a second image navigation control, for selecting a presented image file for presentation in the image window from among the retrieved subset of the plurality of image files, and for graphically indicating the temporal location of the presented image file relative to the retrieved subset of image files, and also for selecting one or more of the retrieved subset of image files for the generating of the animated image file;
the server further for accepting a command entered via the overlay to create the animated image file, the command comprising a user-selected image file is selected by selecting the one of a series of elements associated with the user-selected image file.

14. The system of claim 13, wherein the overlay substantially mimics the media player.

15. The system of claim 14, wherein the image window automatically sequentially presents each of the retrieved subset of the plurality of image files, one at a time.

16. The system of claim 13, wherein:
the second image navigation control comprises a series of elements, each element representing an associated one of the retrieved subset of the plurality of image files; and a user-selected image file is selected by selecting the one of the series of elements associated with the user-selected image file.

17. The system of claim 12, wherein:
the one or more of the indexes comprises a time index specifying the selected one or more of the retrieved subset of image files; and
the animated image file is generated according to the time index.

18. The system of claim 17, wherein the image generation processor associates the time index with a temporal portion of the media program file and generates the animated image file from the temporal portion of the media program file.

19. The system of claim 13, wherein:
the server further accepts a second command via the overlay to select a second subset of the stored plurality of image files of the media program;
the queuing system retrieves the second subset of the stored plurality of image files;
the server further transmits a modified overlay, wherein:
the image window of the modified overlay presents at least one of the retrieved second subset of the plurality of image files, the image window substantially spatially co-extensive with a viewing area of the media player;
the first image navigation control of the modified overlay graphically indicates the temporal location of the temporal center of the retrieved second subset of the image files; and
the second image navigation control further selects the presented image file for presentation in the image window from among the retrieved second subset of image files, graphically indicates the temporal location of the presented image file relative to the retrieved second subset of image files, and selects one or more of the retrieved second subset of image files for the generating of the animated image file.

20. The system of claim 13, wherein:
the server further accepts a third command entered via the overlay select only a spatial portion of the subset of the stored plurality of image files of the media program; and
the animated image file is generated from the selected one or more of the presented subset of the plurality of image files by generating an animated image bitmap using a referenced area of the plurality of image files altered according to the selected spatial portion.

21. A system for generating an animated image file from a video media program file depicting a media program, the media program file comprising a sequence of images, comprising:
a client processing device, having a media player for playing the media program in a media program presentation area and a communication device for transmitting a request to generate the animated image file from a control presented in the media player;
a server, having a second communication device for accepting the request to generate the animated image file from the control presented in the media player;
a queuing system, communicatively coupled to the server, for retrieving at least a subset of a stored plurality of image files of the media program, each of the stored plurality of images files having only one static image and created from at least one image of the sequence of images and associated with a unique time index;
wherein the server transmits the retrieved at least a subset of the plurality of stored image files and an overlay to the client processing device for presentation by a browser over the media player, the overlay comprising:
an image window for presenting at least one of the retrieved subset of the stored plurality of image files, the image window substantially spatially co-extensive with a viewing area of the media player;
a first image navigation control for graphically indicating a temporal location of a temporal center of the retrieved subset of the stored plurality of image files; and
a second image navigation control, for selecting a presented image file for presentation in the image window from among the retrieved subset of the stored plurality of image files, and for graphically indicating the temporal location of the presented image file relative to the retrieved subset of image files, and also for selecting one or more of the retrieved subset of image files for the generating of the animated image file;
wherein the second communication device is configured to further accept a command from the client processing device entered via the overlay to create the animated image file, the command comprising one or more of the indexes specifying the selected one or more of the retrieved subset of image files; and
an image generation processor, communicatively coupled to the queuing system, for generating the animated image file based upon the one or more of the indexes specifying the selected one or more of the retrieved subset of image files.

22. The system of claim 21, wherein:
the image generation processor further processes the sequence of images to generate the at least a subset of the stored plurality of image files, each of the at least a subset of the stored plurality of images of less file size than the associated image of the sequence of images; and
the animated image is generated from versions of the sequence of images of higher resolution than the subset of the plurality of image files.

23. The system of claim 21, wherein:
the processing the sequence of images to generate the at least a subset of the stored plurality of image files comprises at least one of:
further compression of each of the subset of the stored plurality of image files;
reducing pixel dimension of each of the subset of the stored plurality of image files;
reducing color depth of each of the subset of the stored plurality of image files; and
reducing bit depth of each of the subset of the stored plurality of image files.

24. The system of claim 23, wherein:
the index comprises a time index specifying the selected one or more of the retrieved subset of image files; and
the animated image file is generated according to the time index.

25. The system of claim 24, wherein generating the animated image file based upon the index specifying the selected one or more of the retrieved subset of image files comprises:
associating the time index with a temporal portion of the media program file; and
generating the animated image file from the temporal portion of the media program file.

26. The system of claim 23, wherein:

the image generation processor further processes the sequence of images to generate the at least a subset of the stored plurality of image files, each of the at least a subset of the stored plurality of images of less file size than the associated image of the sequence of images; and the animated image is generated from versions of the sequence of images of higher resolution than the subset of the stored plurality of image files.

27. The system of claim 23, wherein:

the processing the sequence of images to generate the at least a subset of the stored plurality of image files comprises at least one of:

further compression of each of the subset of the stored plurality of image files;

reducing pixel dimension of each of the subset of the stored plurality of image files;

reducing color depth of each of the subset of the stored plurality of image files; and reducing bit depth of each of the subset of the stored plurality of image files.

28. The system of claim 23, wherein:

the server further accepts a third command entered via the overlay select only a spatial portion of the subset of the stored plurality of image files of the media program; and the animated image file is generated from the selected one or more of the presented subset of the stored plurality of image files by generating an animated image bitmap using a referenced area of the stored plurality of image files altered according to the selected spatial portion.

29. The system of claim 23, wherein image generation processor generates the stored plurality of image files from the sequence of images of the media program by:

generating an ordered sequence of frames from the video media program file according to frame size and a frame rate;

determining if the media program is an animation program;

if the media program is an animation program, generating a portable network graphics (PNG) file for each of the plurality ordered sequence of frames; and if the media program is not an animation program, generating a joint picture experts group (JPEG) file for each of the ordered sequence of frames.

* * * * *